June 8, 1954    G. LAZAROWICZ    2,680,388
VARIABLE SPEED POWER TRANSMISSION
Filed April 30, 1951    2 Sheets-Sheet 1

INVENTOR,
Gustaw Lazarowicz

June 8, 1954  G. LAZAROWICZ  2,680,388
VARIABLE SPEED POWER TRANSMISSION
Filed April 30, 1951  2 Sheets-Sheet 2

INVENTOR,
Gustav Lazarowicz

Patented June 8, 1954

2,680,388

UNITED STATES PATENT OFFICE 2,680,388

VARIABLE SPEED POWER TRANSMISSION

Gustaw Lazarowicz, Toronto, Ontario, Canada

Application April 30, 1951, Serial No. 223,678

6 Claims. (Cl. 74—796)

The invention relates to variable speed power transmission as described in the present specification and shown in the accompanying drawings that form a part of the same.

The main object of the invention is to provide for the change of angular velocity between the driving and the driven members in a stepless way.

A further object of the invention is to provide a transmission whereby speed changes are effected without gears requiring to be moved into and out of mesh with one another, so that gear shifting with its attendant noise, is avoided, as is also the danger of the vehicle getting out of control during the such gear shifting operation.

The present transmission is an internal friction transmission in which one or more friction elements are pushed against the inner wall of a concaved element by centrifugal force. There is also provided means, either manually operable, semi-automatic, or wholly automatic, for setting and varying the speed ratio between the driving and the driven elements.

An extremely advantageous feature of the present invention is the elimination of heavy pressures on bearings, such as is unavoidable with the types of external friction transmissions now in use.

With the above and other objects in view the invention consists in the novel features of construction, arrangements and combinations of parts set out in the present specification and more particularly pointed out in the claims for novelty following.

In describing the invention reference will be made to the accompanying drawings, in which.

Like numerals of reference indicate corresponding parts in the various figures.

Figure 1:
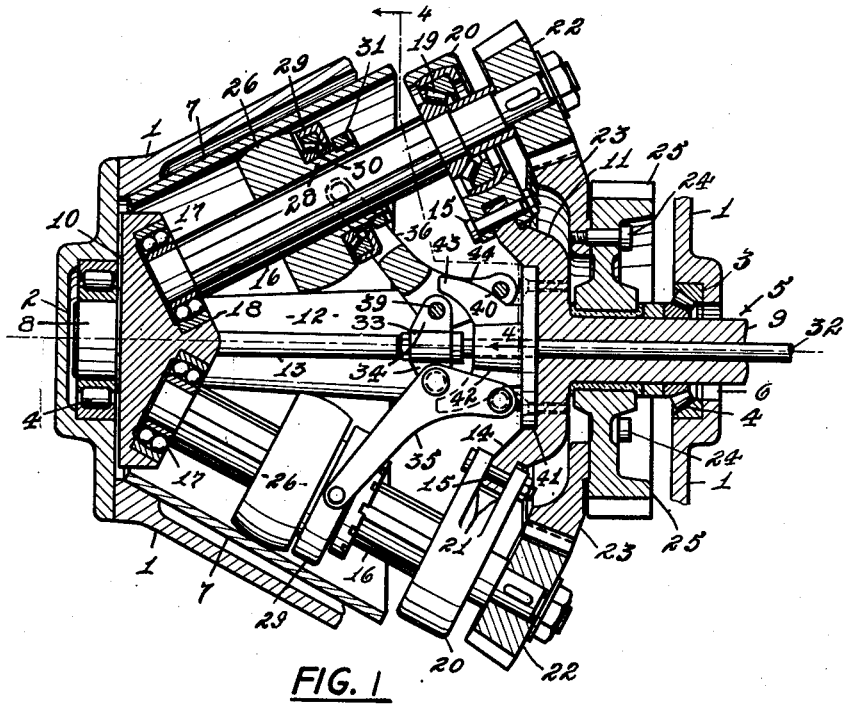
Figure 1 is a central vertical sectional view through a power transmission embodying my invention, a portion of the housing being broken away.
Figure 2:
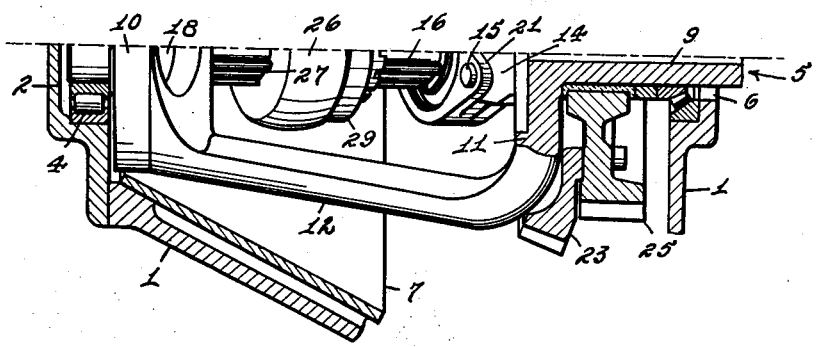
Figure 2 is a bottom view of Figure 1, with the lower splined shaft and its friction wheel and supporting means omitted.
Figure 3:
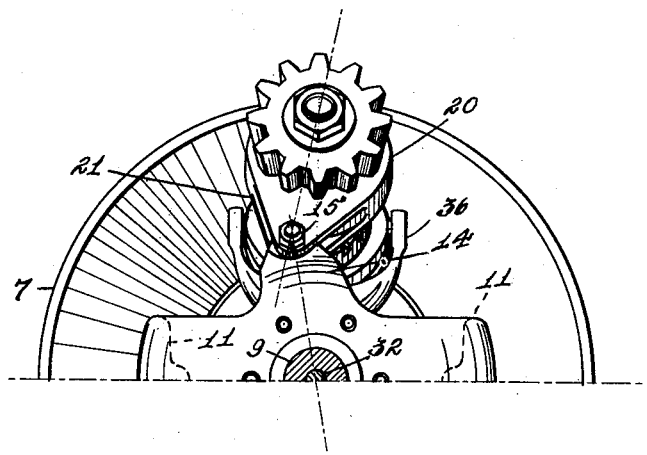
Figure 3 is an end view of one half of the transmission with the casing and the power take-off gears omitted.
Figure 4:
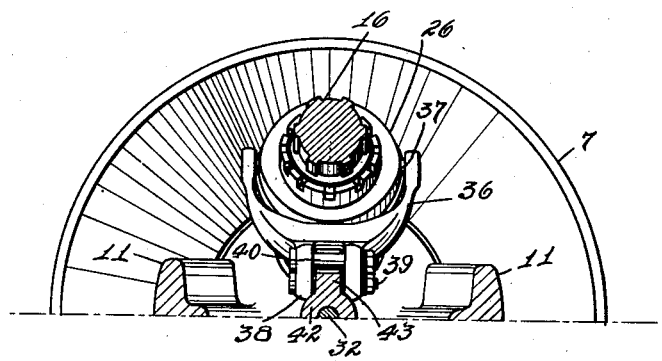
Figure 4 is a cross sectional view taken on the line 4—4 of Figure 1.

Referring to the drawings, 1 is the transmission casing which in substantial conformity with the general design of the transmission assembly is preferably substantially pear shape in side elevation.

The casing 1 is suitably recessed at its ends, or otherwise formed, to provide aligned bearing housings 2 and 3, respectively, for containing bearings 4 suitable to the support of the drive shaft 5 and, while the outer end of said casing is closed, the inner end is provided with an opening 6 for the passage of the said driving shaft therethrough.

7 is a friction element of substantially frustro-conical cross section, fixed within the outer end of the transmission casing for movement therewith and extending from the closed end of said casing to substantially the longitudinal centre thereof and providing an inwardly diverging rotatable wall.

The driving shaft 5 comprises two longitudinally aligned, spaced bearing parts 8 and 9 journaled in the respective outer and inner ends of the casing 1; a head 10 positioned in the narrower end of the concave member 7; oppositely extending shoulders 11 at the inner end of the bearing part 9, considerably removed from the corresponding end of the casing; and intermediate arms 12 extending from opposite sides of the head 10 in divergent relation to one another and joining with the respective shoulders 11. The arms 12 are preferably provided with lengthwise extending central flanges 13 to insure rigidity.

The lateral enlargement of the shaft 5 which provides the shoulders 11 is provided with diametrically opposed inwardly extending curved arms 14 between said shoulders and each such arm is provided with an opening near its end to provide for the passage of a bearing pin 15 therethrough.

16 are multi-splined countershafts positioned in diametrically opposed relation to one another and extending substantially parallel with but spaced from the conical element 7. The countershafts are supported at their one ends by self-aligning ball bearings 17 housed in recesses 18 in the head 10, and at points somewhat removed from their outer ends are supported by self-aligning roller bearings 19 carried in bearing holders 20, beyond which the said shafts extend.

The bearing holders 20 are provided with bifurcate extensions 21 adapted to receive the ends of the curved arms 14 respectively, and to which said arms they are pivoted by means of the pivot pins 15 so that the said bearing holders are free to swing in a lateral direction towards and away from the concave element 7.

Each of the countershafts carries on that end which projects outwardly beyond the bearing holders 20, a fixed bevel gear 22 and such bevel gears are in turn meshed with a common bevel gear 23, which latter for convenience is fixed by pins 24 to a gear 25. This gear 25 rotates freely around the drive shaft 5 and constitutes the power take-off element of the transmission.

26 are friction members, hereinafter called wheels, mounted on the countershafts 16 for sliding movement lengthwise of said shafts but being restrained from rotary movement on the shafts by reason of the longitudinal splines of the shafts entered in suitable notches 27 in the said wheels. These wheels are adapted upon the rotation of the main shaft to be thrown outwardly by centrifugal force into engagement with the inner face of the concave member 7 so that the said wheels will be caused to rotate and thus cause rotation of the shafts 16 which, in turn, through the action of the bevel gears 22 carried on the ends of the said shafts and meshing with the gear 23 common to both said bevel gears, will cause the power take-off gear 25 to be rotated.

It is of course evident that the speed ratio between the drive shaft 5 and the power take-off gear will be determined by the positions of contact between the friction wheels and the concave element 7; that is to say, the farther the said wheels are along the shafts in the direction of the narrower end of the concave member 7 the slower will be the speed of rotation of the power take-off gear 25, and vice versa.

In the present preferred means for effecting the movement of the friction wheels along their shafts, the said wheels are provided at their sides nearest to the bearing holders 20 with reduced portions 28 which, with suitable flanged means thereon, provide annular housings 29 for roller bearings 30. Locking washers 31 located in annular grooves in the reduced end 28 beyond the bearing housings provide means for locking the said housings to their positions.

32 is a push rod which extends loosely through the bearing part 9 of the drive shaft 5 and carries on its inner end a collar 33 having lateral oppositely extending, flat-sided wings 34.

The friction wheels 26 have pivoted connection with the respective wings 34 through the medium of leverage members 35 which, in side elevation are of substantially L-shape and which in plan present at their one ends bifurcate portions 36 which span the respective gear housings 29 and are pivoted thereto by pins 37. The members 35 at their other ends are forked to provide spaced arms 38 embracing at the heel portions of the members 35 the corresponding side wing 34, carried by the rod 32. The members 35 have pivotal connection with the wing members 34, respectively, by means of pins 39. The forked ends 38 of the members 35 continue towards the inlet end of the casing and the arms of the respective forked ends are connected by transverse pins 40.

A plate 41 is fixed to the inner end of the bearing part 9 of the driving shaft and said plate carries a short inwardly extending hub 42 which, together with the said plate is bored to slidably receive the rod 32, whereby the latter may be moved freely inwardly and outwardly to move the collar 33 carrying the wings 34 towards and away from the said hub.

The hub 42 is provided with oppositely disposed, relatively divergent cam fingers 43 which extend loosely between the side arms of the forked parts 38 of the members 35 respectively and between the transverse pins 39 and 40 located respectively at the heel and toe portions of said members 35. The fingers 43 have their outer edges (those edges nearest the toe portions 40) convexed, as shown at 44.

It will thus be seen that when the rod 32 is pushed inwardly the heel portions of the members 35 will also move inwardly causing the said members to pivot slightly on the pins 39, and further causing the toe ends to move inwardly, during which latter process the pins 40 will be forced to ride forwardly over the cam edges 44 of the fingers 43 and will thus force the friction wheels towards the narrow end of the concave member 7. Outward movement caused by a pull on the rod 32 will cause the wheels to move simultaneously towards the wider end of the concave member, during which the pins 40 will ride the cams 44 in the opposite direction and force the friction wheels along their shafts in the direction to cause an increase in the speed of the shafts 16 and consequently of the power take-off gear 25.

The present invention is not concerned with the means for effecting lengthwise movement of the rod 32.

In the operation of the invention the power take-off gear (or other take-off element) is connected up to the shaft, or other device to be driven, and the drive shaft 5 is set in motion and the rod 32 is moved lengthwise to provide the required predetermined speed ratio between the driving and the driven elements. As the shaft 5 rotates the bearing holders 20 are influenced outwardly by centrifugal force and because of the lateral movement thereof permitted by their pivoted connections with the arms 11, they are thrown outwardly to the extent that the friction wheels 26 are forced into contact with the inner surface of the concave element 7. Engagement of the said wheels with the concave element will cause the shafts 16 to be rotated and, consequently the bevel gears 22 carried on the ends of the respective shafts will impart movement to the bevel gear 23, which latter in turn will rotate the power take-off gear 25. The speed ratio between the drive shaft and the driven element can be altered at will by simple lengthwise manipulation of the rod 32 which, as explained in detail hereinbefore, will effectually operate to effect such alteration in a smooth and stepless manner.

While I have illustrated and described herein the present preferred form of construction for carrying out my said invention, this is capable of variation and modification without departing from the spirit of the invention. I, therefore, do not wish to be limited to the precise details of construction set forth, but desire to avail myself of such variations and modifications as come within the scope of the appended claims.

What I claim is:

1. In a variable speed transmission, a fixed internal friction element of hollow cone shape, a driving shaft concentric with and extending lengthwise of and within said internal friction element, a countershaft movable with said driving shaft and tiltable in respect thereto towards the inner periphery of said internal friction element through the rotation of said driving shaft, said countershaft being rotatable about its longitudinal axis, a friction wheel mounted on said countershaft for movement lengthwise of said countershaft and being restrained against rotary movement in respect to said countershaft, said friction wheel being subject to peripheral frictional contact with the interior surface of said internal friction element through the tilting of said countershaft whereby said wheel and said countershaft are rotated together, a power take-off member, gear means between said countershaft and said take-off member, and means for moving said friction wheel lengthwise of said countershaft to vary the point of contact lengthwise of the cone-shaped interior surface of said internal friction element between said friction wheel and said internal friction element whereby to vary the speed ratio between said driving shaft and said power take-off member.

2. In a variable speed transmission, a casing, an internal friction element fixed within said casing, the interior wall of said internal friction element being of substantially cone shape, a driving shaft journaled in the opposing ends of said casing and extending lengthwise through said internal friction element in concentric relation thereto, a tiltable countershaft supported by said driving shaft between said driving shaft and the interior wall of said internal friction element, said countershaft being tiltable in respect to said interior wall through and in accordance with the speed of rotation of said driving shaft, a friction wheel mounted on said countershaft for movement lengthwise of said countershaft but being restrained from movement around said countershaft, said friction wheel being movable through the tilting movement of said countershaft, due to the rotation of said driving shaft, into peripheral contact with the interior wall of said internal friction element for rotation due to such contact, a power take-off member, gear connections between said countershaft and said power take-off member, and means for moving said friction wheel lengthwise of said countershaft to vary at will the point of contact lengthwise of the cone-shaped interior wall of said internal friction element between said friction wheel and said internal friction element to alter the speed ratio between said driving element and said power take-off member.

3. A variable speed transmission according to claim 2, characterised by a ball housing and self-aligning ball bearings carried by said driving shaft obliquely disposed in respect to the longitudinal axis of said driving shaft within the reduced end of said internal friction element, and constituting the journal for the one end of said countershaft; and a roller-bearing-equipped housing pivotally supported by a lateral extension from said driving shaft and constituting a second journal for said countershaft adjacent the larger end of said internal friction element.

4. In a stepless variable speed transmission, a casing, an internal friction element fixed within said casing, the interior wall of said internal friction element being of cone shape, a driving shaft comprising spaced longitudinally aligned cylindrical bearing parts journaled in opposite ends of said casing, a head carried on one of said bearing parts within the reduced end of said internal friction element, diametrically opposed shoulders extending laterally from the other of said bearing parts beyond the larger end of said internal friction element and arms extending from the outer extremities of said shoulders to said head, a bearing housing pivotally supported by one of said shoulders for movement towards and away from said internal friction element, a bearing housing within said head obliquely disposed in respect to the longitudinal axis of said driving shaft and aligned with the aforesaid bearing housing, self-aligning bearings carried in the respective bearing housings, a countershaft journaled in said bearings in said head and extending through and beyond the other of said bearing housings, said countershaft being tiltable through centrifugal force applied thereto on the rotation of said driving shaft, a friction wheel movable lengthwise of said countershaft between said bearing housings, said friction wheel being restrained against movement around said countershaft, said friction wheel being moveable into peripheral contact with the interior wall of said fixed internal friction element on the tilting of said countershaft and being rotatable due to such contact and consequently imparting coincident rotary movement to said countershaft, a bevel gear fixed to said countershaft beyond the outermost of said bearing housings, a power take-off member having operative connection with said bevel gear whereby rotary movement imparted to said friction wheel will be imparted to said take-off member, and means for moving said friction wheel lengthwise of said countershaft to vary the speed ratio between said driving shaft and said power take-off member.

5. A stepless variable speed transmission according to claim 4, wherein said countershaft is provided with longitudinal splines and said friction wheel is provided with interior notches receiving the respective splines, whereby said friction wheel is free to move lengthwise of said countershaft but is restrained against movement around said countershaft whereby rotary movement of said friction wheel will result in coincident rotary movement of said countershaft.

6. A stepless variable speed transmission according to claim 4, wherein said means for effecting the movement of said friction wheel along said countershaft consists of a rod extending inwardly into said casing through the corresponding end bearing part of said driving shaft and sliding freely therein between said shoulders and said head, a wing extending laterally from said rod inwardly of said shoulders, a substantially L-shaped leverage member having pivotal connection at its heel with said wing and at the end of its arm having pivotal connection with said friction wheel, the foot of said substantially L-shaped leverage member comprising spaced parallel arms extending towards the inlet end of the casing, a pin extending transversely of said arms at the outer ends thereof, and a finger carried by said driving shaft extending between the arms of said foot, the outer surface of said finger being convexed in a direction lengthwise of said driving shaft and providing a cam surface engaged by said pin whereby to translate the lengthwise movement of said rod to an angular movement of said friction wheel in correspondence with the angular relation of said driving shaft to said countershaft.

References Cited in the file of this patent

UNITED STATES PATENTS

| Number | Name | Date |
|---|---|---|
| 464,895 | Riddell | Dec. 8, 1891 |
| 1,370,080 | Ahond | Mar. 1, 1921 |
| 1,611,459 | Khatunzett | Dec. 21, 1926 |
| 1,867,843 | Joyce | July 19, 1932 |
| 1,887,505 | Gibson | Nov. 15, 1932 |
| 2,109,695 | Graham | Mar. 1, 1938 |
| 2,275,243 | Bade | Mar. 3, 1942 |
| 2,315,067 | Madle | Mar. 30, 1943 |

FOREIGN PATENTS

| Number | Country | Date |
|---|---|---|
| 603,224 | Germany | Oct. 2, 1934 |